United States Patent [19]

Maier et al.

[11] 3,766,723
[45] Oct. 23, 1973

[54] ROW-CROP HARVESTER

[75] Inventors: Martin Maier; Josef Purrer, both of Gottmadingen, Germany

[73] Assignee: Maschinenfabrik Fahr A.G., Gottmadingen, Germany

[22] Filed: Nov. 6, 1972

[21] Appl. No.: 304,266

[52] U.S. Cl. .................................. 56/13.3, 56/13.8
[51] Int. Cl. ............................................ A01d 45/02
[58] Field of Search ................... 56/12.8, 13.3, 13.4, 56/16.6, 13.8, 60, 61, 501, 503

[56] References Cited
UNITED STATES PATENTS

| 2,701,942 | 2/1955 | Caldwell, Jr. et al. ............. 56/13.3 |
| 3,169,357 | 2/1965 | Suzue .................................... 56/13.3 |
| 3,583,134 | 6/1971 | Kemper et al. ..................... 56/61 X |
| 3,715,873 | 2/1973 | Zweegers ........................... 56/503 X |

Primary Examiner—Russell R. Kinsey
Assistant Examiner—J. A. Oliff
Attorney—Karl F. Ross

[57] ABSTRACT

A two-row harvester has a pair of guides each adapted to receive a crop row and each provided with a chopper-cutter which severs the crop at its base and chops it up. These chopper-cutters each have a rotor with a substantially vertical axis and each open inwardly into a blower having an impeller formed of a vertical disk whose faces are provided with radial vanes and which is situated between the chopper-cutters. A horizontal drive shaft serving as rotation axis for the blower is provided with a pair of bevel gears which mesh with bevel gears carried on the drive shafts of the cutter-choppers so as to rotate them in opposite senses.

10 Claims, 2 Drawing Figures

ROW-CROP HARVESTER

FIELD OF THE INVENTION

The present invention relates to a harvester for a row crop. More specifically this invention concerns a harvester for corn or another stalk crop which is drawn by a prime mover, such as a tractor, and which simultaneously cuts and chops up two rows of the crop.

BACKGROUND OF THE INVENTION

A row-crop harvester of conventional construction may have a pair of guides each associated with a respective cutter-chopper. The guides are spaced apart by a distance equal to the spacing between adjoining crop rows so that, as the harvester is pulled along, two separate rows are cut and chopped. Each cutter-chopper is further equipped with a respective blower of the centrifugal type whose output is connected to a common pipe opening above a wagon or truck that receives the chopped crop.

Such devices are relatively complicated especially with respect to the various drives for the two chopper-cutters and the two blowers.

OBJECTS OF THE INVENTION

It is therefore an object of the present invention to provide an improved two-row harvester for stalk crops such as corn or sorghum whereby the aforedescribed disadvantages are avoided.

Another object is the provision of a harvester for row crops which is simple and inexpensive.

SUMMARY OF THE INVENTION

These objects are attained according to the present invention in a harvester having two cutter-choppers rotatable about respective upright parallel axes and flanking a single blower which receives the chopped crop and blows it through a duct to a silage wagon.

This blower comprises an upright disk rotatable about a horizontal axis and provided on each of its faces with a plurality of generally radial vanes. A horizontal cylindrical housing or shroud located between the two cutter-choppers encloses this impeller or rotor and is formed at each end with an orifice opening toward a respective cutter-chopper for receiving therefrom the chopped crop.

According to another feature of the invention the two rotation axes of the cutter choppers lie in the same plane as the rotation axis of the impeller so that these elements may all be rotationally linked by such simple means as bevel gears to rotate simultaneously, the two choppers rotating in opposite directions for uniform loading of the drive shaft and of the blower and to feed the crop in opposite directions into the blower.

DESCRIPTION OF THE DRAWING

The above and other objects, features, and advantages will become apparent from the following description, reference being made to the accompanying drawing in which.

SPECIFIC DESCRIPTION

Figure 1:
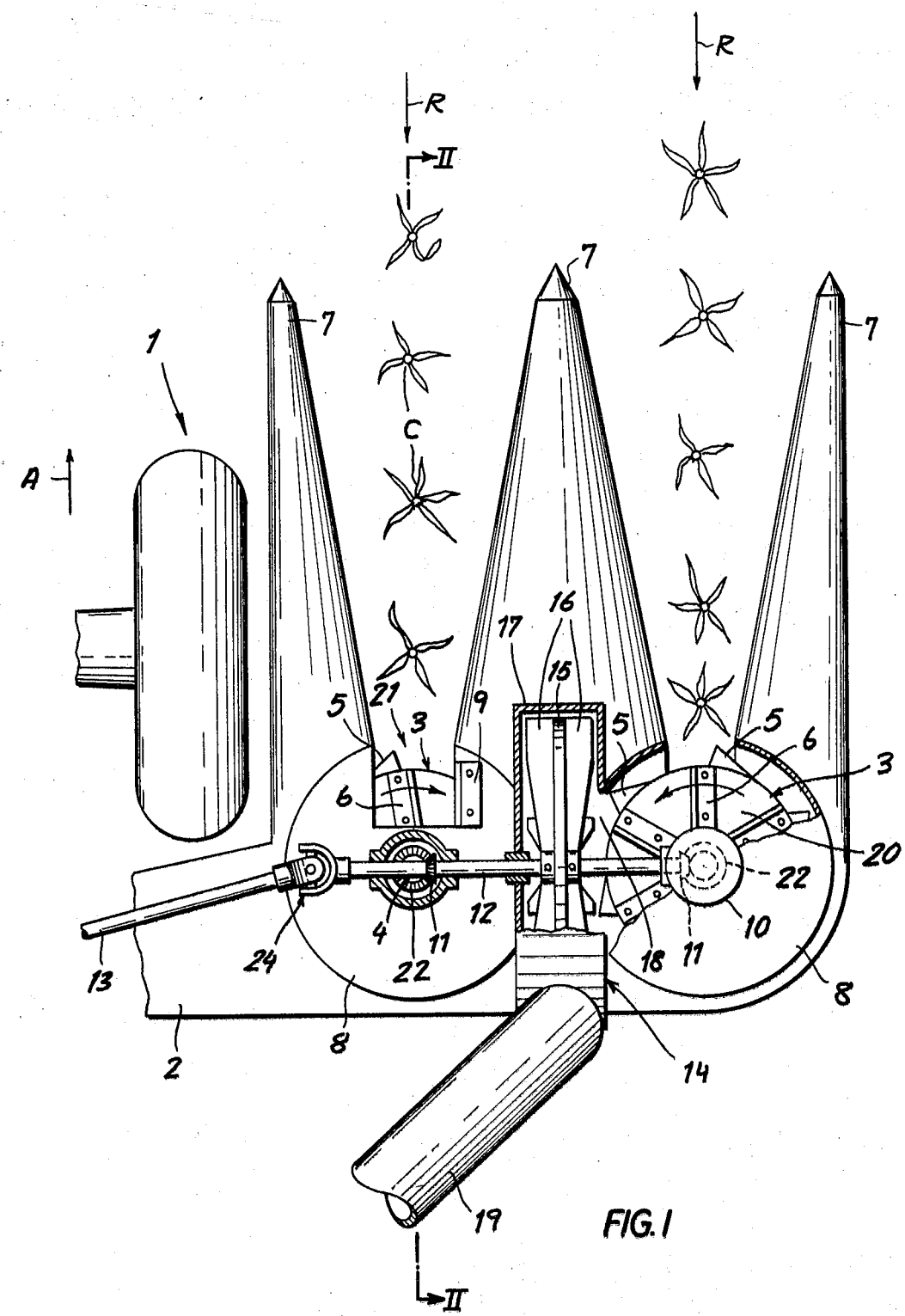
FIG. 1 is a top view of the apparatus according to the present invention.

A tractor indicated at 1 in FIG. 1 pulls in direction A the frame 2 of a harvester having two guides 7 adapted to receive rows R of crop C. The tractor has a conventional three-point hitch to which the harvester is connected. Each guide 7 opens forwardly and can be provided on its inner edges with belts or augers for drawing the crop back into the device although this can also result exclusively from forward movement of the harvester.

At the throat of each guide is a chopper-cutter 3 comprising a horizontally oriented disk 20 provided on its lower edge with cutter blades 5 and on its upper face with chopper blades 6 which coact with blades 9 carried on the housing 2. The blades 6 can be angled back from radii of the disks 20 as shown to the shaft in FIG. 1 and the blades 9 extend like secants thereon so as to shear the crop. Each device 3 has an upright cylindrical housing 8 formed at its front with a notch 21 at which, the crop C is cut and chopped, and on whose edge the counter blade 9 is provided. In addition each chamber 8 is formed with a radially opening square hole or window 18 which opens into the ends of a short axial blowing chamber 17 located between the two housings 8.

Figure 2:
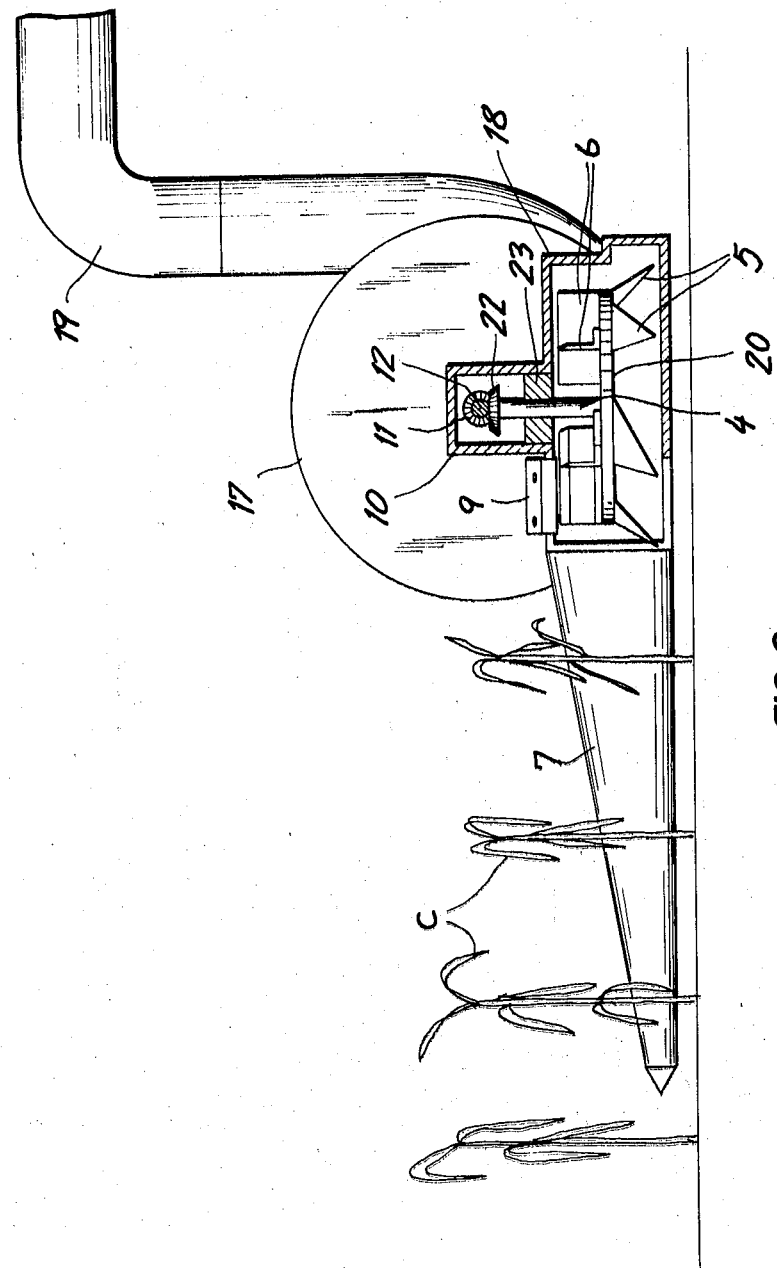
FIG. 2 is a cross-sectional view taken along line II—II of FIG. 1.

This blowing chamber 17 forms, along with a disk rotor (impeller) 15 formed on its two faces with radial vanes 16, a blower 14 for displacing the chopped crop into a silage wagon. A horizontal drive shaft 12 journaled in two upright bearing housings 10 on the housings 8 serves as rotation axis for the rotor 15. In addition this shaft 12 carries two bevel gears 11 meshing with bevel gears 22 carried on the support shafts 4 of the choppers 3. The shafts 4 are supported in bearings 23 in the axle housings 10. Thus, rotation of the shaft 12 by means of a drive shaft 13 connected thereto by means of a universal joint 24 and itself connected to the power takeoff of the tractor 1 by a universal-joint shaft rotates the blower counterclockwise, as seen in FIG. 2 and counterrotates the two choppers 3 to throw the cut and chopped crop into the chamber 17 through the openings 8. Thence the rotating vanes 16 blow the crop out through the conduit 19.

Since the two choppers rotate in opposite directions the shaft 12 is stressed in opposite senses so that it is evenly loaded in the torsional sense. Similarly since the disk 15 is subjected to opposite forces parallel to its rotation axis by the two choppers 3 which shoot the cut and chopped crop against it in opposite directions it is also not subjected to excessive unbalanced axial forces tending to wear out its bearings.

We claim:

1. A harvester comprising:
   a chassis displaceable along the ground in a transport direction;
   a pair of guides having throats opening in said direction and spaced apart on said chassis transverse to said direction, said guides each being adapted to receive a row of crop;
   respective cutters in said throats of said guides for cutting said crop;
   a blower between said cutters on said chassis and having a housing provided with opposite sides opening toward said cutters; and
   means associated with each of said cutters for passing the cut crop from the respective cutter into said blower through the respective side thereof, whereby the cut crop is discharged by said blower from said housing.

2. The harvester defined in claim 1 wherein said blower further comprises an impeller rotatable between said cutters about a generally horizontal axis.

3. The harvester defined in claim 2 wherein each cutter comprises a rotor rotatable on said chassis about a respective upright axis;

4. The harvester defined in claim 3 wherein said housing is cylindrical and centered on said horizontal axis.

5. The harvester defined in claim 4 wherein said housing has end walls each formed with an orifice opening toward a one of said cutters.

6. The harvester defined in claim 3 wherein said upright axes and said horizontal axis lie in a common upright plane, said upright axes being substantially parallel.

7. The harvester defined in claim 6, further comprising drive means including an impeller drive shaft carrying said impeller and lying on said horizontal axis, respective rotor drive shafts carrying said rotors and lying on said upright axes, and gears rotationally coupling said rotor shafts to said impeller shaft at the intersections of said axes.

8. The harvester defined in claim 7 wherein said gears are bevel gears.

9. The harvester defined in claim 8 wherein said impeller drive shaft carries a pair of such bevel gears and said rotor drive shafts each carry one such bevel gear so meshing with the gears of said impeller shaft as to rotate said rotors in opposite rotational senses.

10. The harvester defined in claim 8 wherein said upright axes are parallel and extend at right angles to said horizontal axis.

* * * * *

UNITED STATES PATENT OFFICE
CERTIFICATE OF CORRECTION

Patent No. 3,766,723　　　　　　　　　　Dated October 23, 1974

Inventor(s) MARTIN MAIER, ET AL

It is certified that error appears in the above-identified patent and that said Letters Patent are hereby corrected as shown below:

In the heading, after line [21] insert as follows:

-- [30] Foreign Application Priority Data

November 4, 1971　　　　Germany　　　　P 21 54 804.9 --.

Signed and sealed this 13th day of August 1974.

(SEAL)
Attest:

McCOY M. GIBSON, JR.　　　　　　　　C. MARSHALL DANN
Attesting Officer　　　　　　　　　　Commissioner of Patents